US011503953B2

(12) United States Patent
Van Erp

(10) Patent No.: US 11,503,953 B2
(45) Date of Patent: Nov. 22, 2022

(54) APPARATUS AND METHOD FOR HEATING FRYING OIL WITH SOLID-STATE RF ENERGY TECHNOLOGY

(71) Applicant: GEA FOOD SOLUTIONS BAKEL B.V., Bakel (NL)

(72) Inventor: Joost Van Erp, Nuenen (NL)

(73) Assignee: GEA FOOD SOLUTIONS BAKEL B.V., Bakel (NL)

( * ) Notice: Subject to any disclaimer, the term of this patent is extended or adjusted under 35 U.S.C. 154(b) by 0 days.

(21) Appl. No.: 16/609,288

(22) PCT Filed: May 9, 2018

(86) PCT No.: PCT/EP2018/061998
§ 371 (c)(1),
(2) Date: Oct. 29, 2019

(87) PCT Pub. No.: WO2018/206638
PCT Pub. Date: Nov. 15, 2018

(65) Prior Publication Data
US 2020/0187715 A1 Jun. 18, 2020

(30) Foreign Application Priority Data

May 9, 2017 (EP) .................................. 17170103
Apr. 25, 2018 (EP) .................................. 18169163

(51) Int. Cl.
*A47J 37/12* (2006.01)
*H05B 6/68* (2006.01)
(Continued)

(52) U.S. Cl.
CPC ....... *A47J 37/1233* (2013.01); *A47J 37/1214* (2013.01); *A47J 37/1223* (2013.01);
(Continued)

(58) Field of Classification Search
CPC .... A47J 37/1223; A47J 37/12; A47J 37/1214; A47J 37/1233; A47J 37/1238; H05B 6/784; H05B 6/802; H05B 6/687
(Continued)

(56) References Cited

U.S. PATENT DOCUMENTS 4,457,220 A 7/1984 Entremont et al.
4,580,024 A * 4/1986 Thomas .................. A47J 37/12
219/417
(Continued)

FOREIGN PATENT DOCUMENTS

CN 102986756 A 3/2013
CN 105142253 A 12/2015
(Continued)

OTHER PUBLICATIONS

International Search Report and Written Opinion for International Application PCT/EP2018/061998, dated Jul. 6, 2018.
(Continued)

*Primary Examiner* — Reginald Alexander
(74) *Attorney, Agent, or Firm* — The Dobrusin Law Firm, P.C.

(57) ABSTRACT

The present invention relates to a processing apparatus, in which a flying oil is heated, disinfected and/or pasteurized, sterilized. The present invention further relates to a method to treat a flying oil with radio-frequency wave.

17 Claims, 2 Drawing Sheets

(51) Int. Cl.
*H05B 6/80* (2006.01)
*H05B 6/78* (2006.01)

(52) U.S. Cl.
CPC ....... *A47J 37/1238* (2013.01); *A47J 37/1266* (2013.01); *H05B 6/686* (2013.01); *H05B 6/784* (2013.01); *H05B 6/80* (2013.01); *H05B 6/802* (2013.01); *H05B 2206/045* (2013.01)

(58) Field of Classification Search
USPC ...... 210/DIG. 8, 167.28; 219/684, 687, 688, 219/698
See application file for complete search history.

(56) References Cited

U.S. PATENT DOCUMENTS

| | | | |
|---|---|---|---|
| 4,688,475 A * | 8/1987 | Witt | G05D 23/1951 99/325 |
| 5,253,567 A | 10/1993 | Gunawardena | |
| 6,246,040 B1 | 6/2001 | Gunn | |
| 2006/0006172 A1 | 1/2006 | Sedlmayr | |
| 2011/0033584 A1 | 2/2011 | Bilchinsky et al. | |
| 2011/0159103 A1 | 6/2011 | Akashe et al. | |
| 2012/0103975 A1 | 5/2012 | Okajima | |
| 2014/0356496 A1 * | 12/2014 | Melnyczuk | A23B 7/03 426/242 |
| 2015/0271877 A1 | 9/2015 | Johansson | |
| 2016/0278170 A1 | 9/2016 | Atherton et al. | |
| 2016/0324195 A1 | 11/2016 | Simunovic et al. | |

FOREIGN PATENT DOCUMENTS

| | | |
|---|---|---|
| CN | 105698228 A | 6/2016 |
| EP | 2322883 A1 | 5/2011 |
| FR | 2264494 A1 | 10/1975 |
| GB | 2098040 A | 11/1982 |
| JP | H07255388 A | 10/1995 |
| RO | 125073 B1 | 9/2010 |
| WO | 2009/116923 A1 | 9/2009 |
| WO | 2014/147651 A1 | 9/2014 |
| WO | 2016/100539 A1 | 6/2016 |

OTHER PUBLICATIONS

International Preliminary Report on Patentability for International Application PCT/EP2018/061998, dated Sep. 5, 2019.
Yadav Deep et al—Microwave technology for disinfestation of cereals and pulses, pp. 3568-3576, dated Dec. 16, 2012.
XP002781829—Database WPI, Week 201349, DB accession, n° 2013-K85640; & CN 102 986 756 A, Mar. 27, 2013.
Chinese Office Action dated Jul. 22, 2022, for CN Application No. 201880030458.8.

* cited by examiner

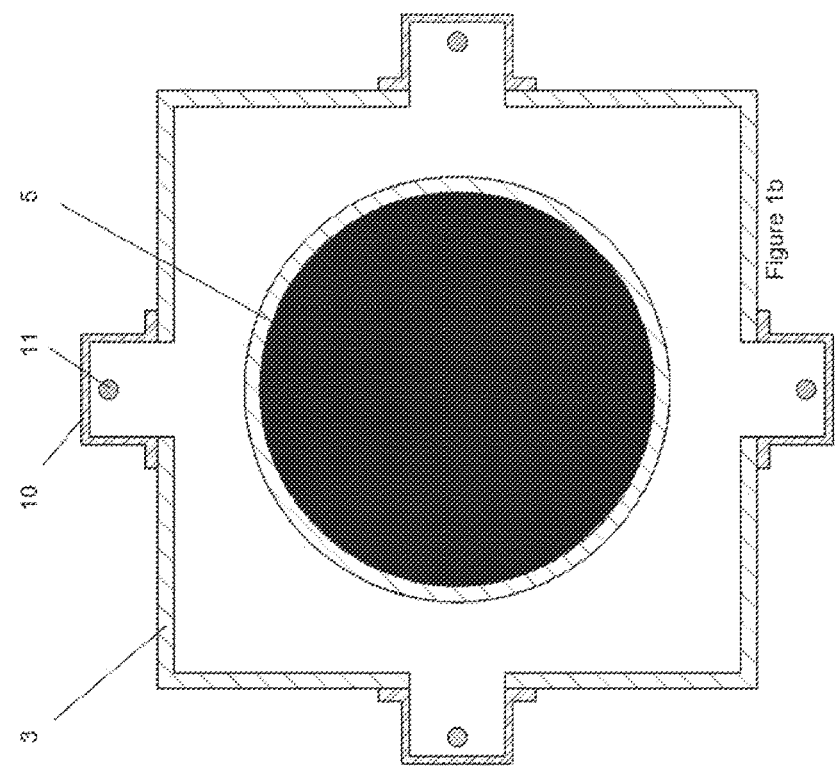
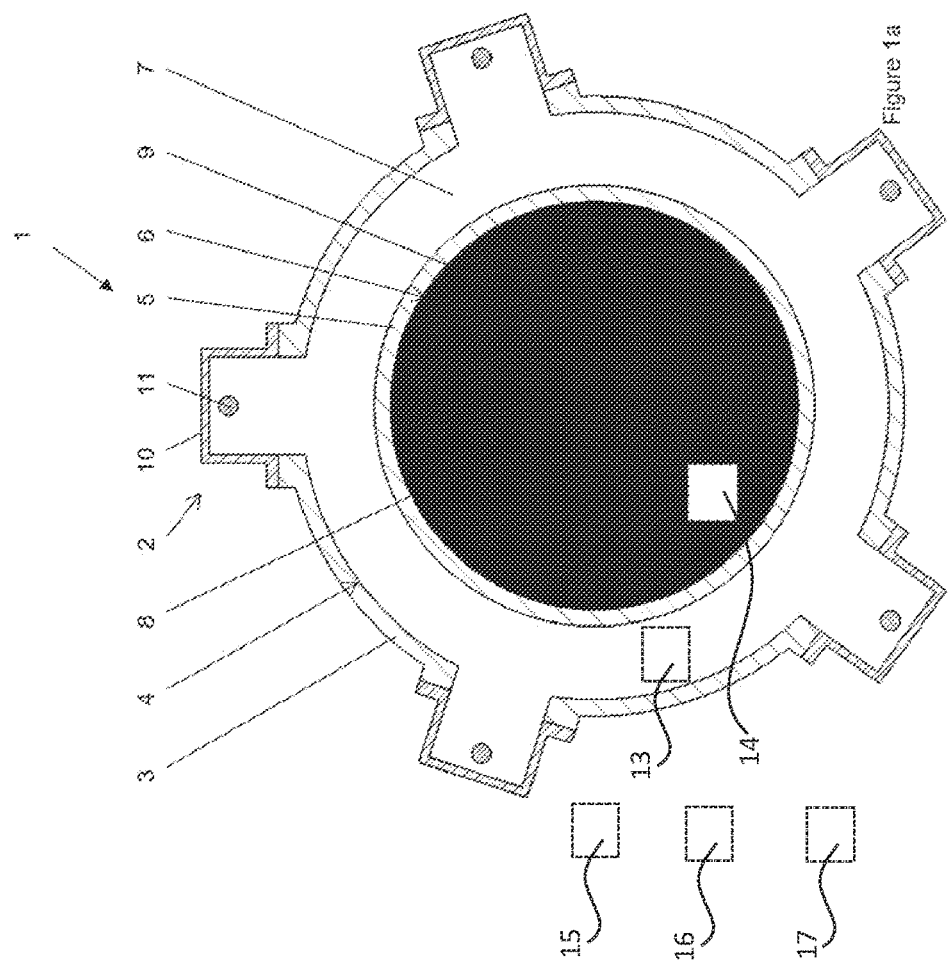

APPARATUS AND METHOD FOR HEATING FRYING OIL WITH SOLID-STATE RF ENERGY TECHNOLOGY

CROSS-REFERENCE TO RELATED APPLICATIONS

This application is a US National Stage Entry of PCT/EP2018/061998 filed on May 9, 2018 and which claims foreign priority to EP 17170103.0 filed May 9, 2017 and to EP 18169163.5 filed on Apr. 25, 2018, all of which are expressly incorporated by reference herein for all purposes.

FIELD

The present invention relates to a processing apparatus, in which a product is transported from an entry to an exit and is fried in a frying oil. The present invention further relates to a method heat a frying oil with radio-frequency waves.

BACKGROUND

In a conventional industrial continuous fryer, used to fry for instance meat products, the frying oil is heated up till approximately 180° C. depending on the products to be fried. Products to be fried enter the fryer via a conveyor and the products will be guided through the fryer via one or more conveyors, preferably a lower conveyor in combination with a hold down conveyor. Via the lower conveyor the products will exit the fryer. A heat exchanger is applied within the fryer, preferably at the bottom of the fryer. In a known embodiment, electrical elements positioned in stainless steel tubes will heat up the frying oil which flows around the tubes. In another known embodiment thermal oil flows through stainless steel tubes of the heat exchanger. In the latter case the entrance temperature of the thermal oil in the fryer is approximately 250° C. and the exit temperature out of the fryer is approximately 200° C. However, in the apparatus according to the state in the art, it is impossible to control the temperature of the frying oil accurately, so that in most cases, the frying oil is too hot and hence degrades relatively fast, which leads to increased production cost and a relatively energy inefficient mode of operation.

SUMMARY

It is therefore the objective of the present invention to provide a processing apparatus and a method that do not comprise the deficiencies according to the state in the art.

The problem is attained with a processing apparatus, in which a product is transported from a product-entry to a product exit and is fried in a frying oil, wherein the frying oil is pumped by a pump through a microwave chamber and is thereby heated and wherein the microwave chamber comprises at least one, preferably a multitude, solid-state radio frequency source(s).

The disclosure made regarding this subject matter of the present invention also applies to the other invention and vice versa. Subject matters disclosed regarding this invention can also be combined with subject matters from other inventions of the present application.

The present invention relates to a fryer, in which a product is fried. Such a product can be meat-, a cheese, a vegetable product or a combination thereof. The frying takes place in an oil bath, that has preferably a temperature around 180° C. The product is transported through the oil bath from a product-entry to a product-exit, for example by conveyor means or in a moving cage. The product is preferably submerged into the oil bath. The product-entry and the product-exit can be one and the same. However, preferably, the product-entry and the product-exit are spaced apart. The frying process can be batch, continuous or semi-continuous.

The products to be fried preferably enter the inventive processing apparatus via a conveyor and more preferably, the products will be guided through the apparatus via one or more conveyors, even more preferably a lower conveyor in combination with a hold down conveyor. Via the lower conveyor the products preferably exit the fryer.

According to the present invention, the frying oil is pumped by a pump or the like through a microwave chamber and is thereby heated. The microwave chamber comprises at least one, preferably a multitude, solid-state radio frequency source(s), each with a solid-state radio frequency (RF)-transistor(s) in a RF power amplifier. A radio frequency power amplifier is an electronic amplifier, that converts a low power radio frequency signal into a higher power signal. Typically, RF-power amplifiers drive the antenna of a transmitter. The antenna can be coupled to and/or located in a waveguide, wherein the antenna can radiate the microwaves into the waveguide which preferably is designed of reflective material and can guide the microwaves to a desired location, for example into the frying oil chamber wherein the products to be treated are located. Compared to a magnetron, an advantages of a solid-state RF energy technology is a low voltage drive, semiconductor reliability and lower energy consumption due to the advanced control system.

The microwave chamber with the solid-state radio frequency source(s) is used to heat, heat up a frying oil. A frying oil according to the present invention, is any oil used in the industry to a fry a consumable product.

The inventive processing apparatus further comprises a pump which transports, pumps the frying oil past the solid-state radio frequency source(s). The pump can be any means known by the person skilled in the art to move a liquid. The pump can also be means, which add a certain potential energy to the frying oil, so that it can driven by gravitational force past the solid-state radio frequency source(s). The capacity, i.e. the pressure differential and/or the volume-flow of the pump is preferably controllable. Preferably, the pump is controlled based on the temperature of the frying oil in the bath and/or based on the energy provided by the solid-state radio frequency source(s). The pump and hence the flow of the frying oil through the fryer can also be utilized to influence the heat transfer between the frying oil and the product to be fried. Turbulent or laminar heat transfer conditions or a mixture thereof can be achieved in the inventive processing apparatus.

For heating purposes, the frying oil flows out of the bath towards the microwave chamber, where it is heated and then flows back into the bath of the fryer. There can be numerous locations in the fryer, where the frying oil is removed and/or numerous locations where the frying oil is fed back into the fryer. One or more entries and/or one or more exits may each be equipped with a valve in order to adjust the flow towards or from the fryer. Within the fryer the frying oil is preferably flowing in the same direction as the direction of the product flow. This may be advantageous in order to prevent distortion of the position of the food products on the conveyor and to achieve that sediment such as loosen particles, for instance coating in case of coated products, can be collected and discharged via a preferably build-into the fryer filter- and sediment removal means. A preferably integrated pump, schematically illustrated at 13, will force the filtered oil back to the entrance site of the fryer. In case an additional external filter is applied the preferably pre-filtered oil will be pumped to the external filter positioned nearby the fryer and will from thereon flow back to the entrance side of the fryer. A flow of the frying oil and the products to be fried in the same direction also has the advantage that the highest temperature is at the beginning of the frying, which diminishes the oil uptake of the product during frying.

The fryer preferably comprises a filter, schematically illustrated at 14 and/or sediment-removal within the fryer, preferably within the bath and/or the pump and/or in the tubing to and/or from the pump and/or the microwave chamber, a filter and/or debris removal may be provided.

According to the invention, the frying oil will be exposed to the microwave energy in a microwave chamber, which is according to a preferred embodiment a tube. The microwave chamber, preferably the tube, is preferably made from a material which is at least essentially transparent for microwaves and is hence not or only little heated by the microwave energy. Preferably, the inner area of the pipe is 0.017-0.2 $m^2$ and/or the inner diameter of the pipe is preferably between 0.15 and 0.5 m. The microwave chamber and/or the tube to and/or from the microwave chamber may comprise a mixing device. In case of a tube, the mixing device is preferably a static mixer.

According to a preferred embodiment of the present invention, the inventive apparatus may not only comprise one but a multitude of solid-state radio frequency sources. This can be accomplished by using one or more antennas and/or one or more waveguides.

Each radio frequency source can be preferably powered individually and each radio frequency source can be preferably controlled, more preferably closed loop controlled, more preferably individually. Preferably, the wavelength, amplitude and/or the direction of the radiation can be controlled.

The solid-state radio frequency sources are preferably provided in an array of n columns and m rows, wherein n is an integer >1 and m is an integer 1. Preferably, the solid-state radio frequencies are arranged equidistantly in one row and/or the columns are also arranged equidistantly. In case a multitude of sources, they can be arranged at random.

Preferably, the solid-state radio frequency sources are provided equidistantly around the circumference of the microwave chamber.

Preferably, the inventive processing apparatus comprises means to transport the products, schematically illustrated at 17, to be fried through a bath of hot frying oil, in which the products are preferably submerged. The means 17 are preferably a conveyor, preferably a conveyor-chain. Preferably, two conveyors are provided in parallel, wherein the product is placed between the conveyors to maintain them submerged in the frying oil bath.

Alternatively or additionally, the fryer is designed for batch-processing, wherein the products to be fried are submerged into a hot frying oil bath, for example with a cage.

Preferably, the processing apparatus comprises a control system to control the solid-state radio frequency sources and/or the pump. The control system preferably comprises one or more sensors, schematically illustrated at 16, whose signal(s) is used to control one or more solid-state radio frequency source(s), preferably individually and/or related to each other and/or the control system controls the pump. In an application pumping the frying oil through a tube, gradually heating of the frying oil and/or very precise temperature control can be achieved by controlling the electromagnetic fields by controlling the power level, frequency and/or phase versus time with such precision that, for example, an even energy distribution in the frying oil chamber or in the frying oil will be achieved. The RF-energy load can be adapted to the progress of the heating process. For instance, during heating the RF-energy load can change. This change in load can be detected, for example via the antenna by measuring the reflected energy. The control system will compare the transmitted energy via the antenna with the reflected energy and will consequently adjust the energy to be transmitted by the antenna. At each solid-state RF energy sources, the amplitude, the frequency and/or the phase can be controlled individually and/or in groups. The antenna may function as a sensor, for example to detect the radiation reflected from the frying oil to be treated.

The sensor can sense one or more properties of the frying oil, for example its temperature and/or the energy absorbed by the frying oil and/or its energy absorption rate, which may change as, for example, the color of the frying oil may change. One sensor can measure what kind of radiation is reflected from the frying oil, for example the wavelength. Since the frying oil is transported during its heating with the RF-radiation, there can be multiple sensors along the transportation path. The local reading of the sensors can be used to control the corresponding local solid-state radio frequency source(s) and/or the solid-state radio frequency source(s) upstream and/or downstream from the respective sensor. In a preferred embodiment, the sensor is a thermocouple, for example a PT100.

In case, the frying oil in the fryer is changed, the sensors can determine one or more properties of the frying oil and adjust and/or control the heating of the frying oil. Afterwards or alternatively, the heating of the frying oil, particularly the setting of the solid-state RF energy source can be adapted to the ageing and/or pollution of the frying oil for example with particles.

Alternatively or additionally, the pump can be controlled, for example based on the signal of the sensor and the capacity of the pump can be increased or decreased to alter the residence time of the frying oil in the microwave chamber, particularly the tube.

The inventive processing apparatus is preferably part of a feed- or food production line, which comprises one or more treatment stations. Upstream from the processing apparatus is preferably a batter.

Another preferred or inventive embodiment of the present invention is therefore a production line, particularly a food production line comprising the inventive apparatus. The line has preferably a common control system, so that a change in the recipe of the products to be produced can be executed for all apparatus in the line centrally. For the fryer, this means for example, that the temperature of the frying oil in the bath and/or the residence time of the product to be fried in the bath can be changed automatically.

According to another preferred embodiment, the inventive apparatus is provided together with a cooling unit and/or a packaging unit.

The problem is also solved with a method to heat a frying oil with radio-frequency waves, wherein the radio-frequency waves are provided with one or more solid-state radio frequency source(s).

The disclosure made regarding this subject matter of the present invention also applies to the other invention and vice versa. Subject matters disclosed regarding this invention can also be combined with subject matters from other inventions of the present application.

Preferably the frying oil is transported from an inlet of a treatment apparatus to an exit of the same apparatus which are spaced apart.

Preferably one or more sensors are provided which measure one or more properties of the frying oil, the product to be fried and/or the radiation reflected from the frying oil and/or the product. The properties are preferably measured at least twice during its treatment with RF-radiation. The changes of the properties are determined and can be taken into account when controlling the solid-state radio frequency source(s) and/or a pump which pumps the frying oil through a microwave chamber, preferably a tube.

Transistor technology generates powerful RF fields. Preferably multiple RF sources will be applied, the sources can be controlled individually and preferably related to each other. For instance, in an application pumping a mass through a tube, gradually heating of the frying oil can be achieved by controlling the electromagnetic fields by controlling the power level, frequency and phase versus time with such precision that an even energy distribution will be achieved. In general, in case of a change in load in a certain spot of the frying oil, the controller can control the specific parameters parameter in that certain spot in order to correct the adverse effects of the load change. For instance, during heating the frying oil load may change. This change in load will be detected via the antenna by measuring the reflected energy. The control system will compare the transmitted energy via the antenna with the reflected energy and will consequently adjust the energy to be transmitted by the antenna.

BRIEF DESCRIPTION OF THE DRAWINGS

The inventions are now explained according to the FIGURES. The explanations apply for all embodiments of the present invention likewise.

FIGS. 1a and 1b show a first embodiment of the present invention.

Figure 1C:
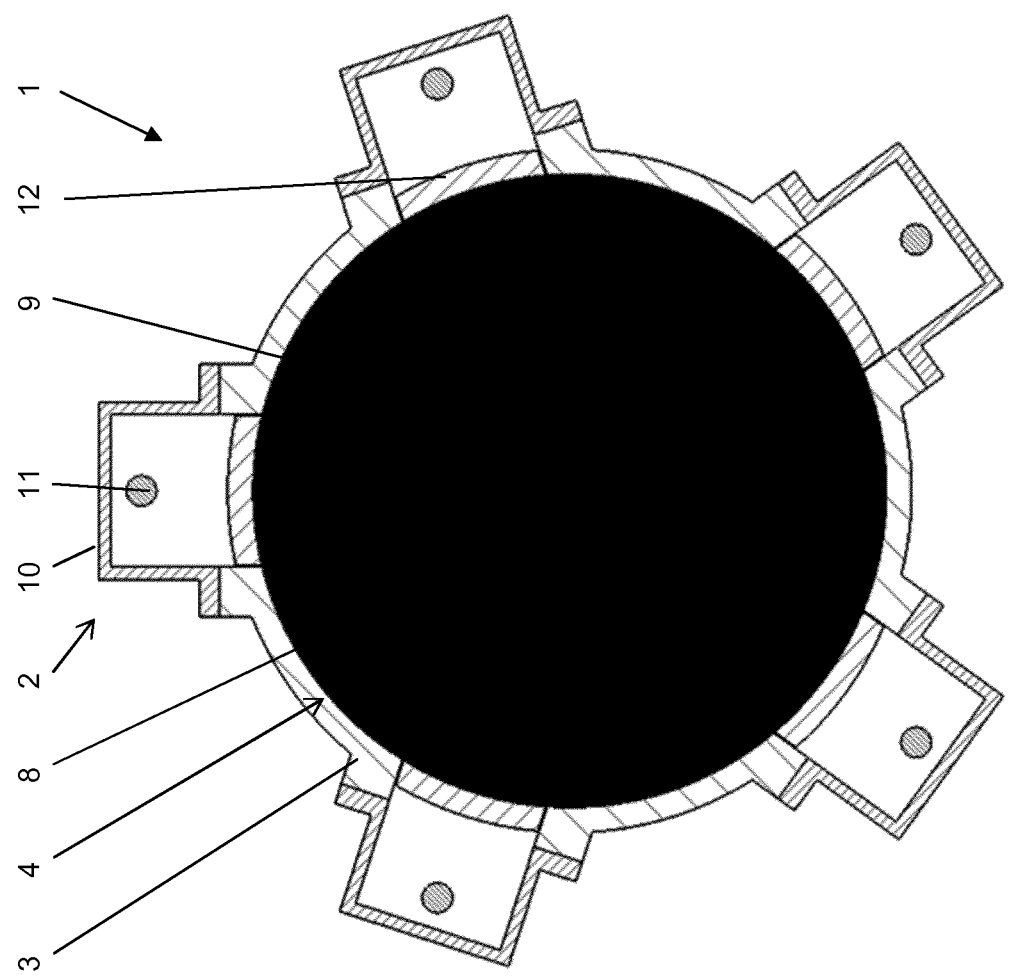
FIG. 1c shows a second embodiment of the present invention.

Detailed Description A first embodiment of a solid-state RF energized microwave apparatus is depicted in FIGS. 1a and 1b, which comprises a multiple solid-state RF sources 2 which each comprises a waveguide 10 and/or an antenna 11. In the present case, the inventive apparatus comprises a multitude, here five, of solid-state RF sources 2, which are provided at the circumference of a frying oil chamber 9 and preferably, equidistantly around the circumference of the of the frying oil chamber. The number of sources 2 in circumferential direction can depend on the efficiency, of the microwaves to heat up frying oil 8 evenly, measured for example by the temperature rise per unit of time. The solid-state RF sources 2 are located in a chamber 7, in the present case defined by housing 3. The housing 3 can be similar to a Faraday cage to prevent electromagnetic waves coming out of the housing. At least inner wall 4 but preferably the entire housing 3 can be made of steel, for instance stainless steel. Inside the chamber 7 and/or inside the housing 3, a frying oil chamber 5, here a microwave tube 5 is provided, which separates the frying oil chamber 5 from the chamber 7, in which the solid-state RF sources 2 are located. The tube material is preferably at least partially, more preferably completely transparent for the microwave energy supplied by the solid-state RF sources 2 and more preferably do not absorb microwave energy and will therefore not be heated up by the microwave energy but, if any, only heated up by the warmed-up product without the build-up of deposit on the inner wall of the tube. Particularly, the tube, particularly its inner wall 6, will not be at a higher temperature than the desired temperature of the frying oil, for example not warmer than 180° C. To effectively convert the microwave energy into increased temperature of the frying oil to be heated, the material of the tube 5 is not metal, but certain plastic materials and/or quartz-materials are suitable, which are more preferably food grade. The frying oil 8 is located within the frying oil chamber 5 and will be heated by one preferably multiple solid-state sources 2 located in chamber 7. This embodiment is, for example, preferred in case cleaning agents used to clean frying oil chamber 5 may not be come in contact with the solid-state sources 2. The tube 5 can also be used to direct the product past the solid-state RF sources 2. If needed, the chamber 7, which surrounds the tube 5 may be cooled to cool the RF-sources.

FIG. 1c shows another embodiment of the present invention. Reference can be made to the description according to FIGS. 1a and b. However, in the present case, there are microwave transparent shielding means 12 which protects the antenna 11 and the waveguide 10 against the frying oil 8. The shielding means are preferably made of a microwave transparent material, for example the material of the tube 5 as described above.

LIST OF REFERENCE SIGNS 1 microwave apparatus
2 solid-state RF energy source
3 housing
4 inner wall housing 3
5 frying oil chamber, microwave tube
6 inner wall microwave tube 5
7 solid-state source chamber
8 frying oil
9 frying oil chamber
10 waveguide
11 antenna
12 microwave transparent shielding means

The invention claimed is:

1. Processing apparatus, in which a product is transported by a means to transport the product and is fried in a frying oil chamber containing frying oil,
   wherein the frying oil is pumped by a pump in a flow direction through a microwave chamber and is thereby heated,
   wherein the microwave chamber is provided as a tube, the microwave chamber comprises at least one solid-state radio frequency source,
   wherein the frying oil is configured to flow out of the frying oil chamber towards the microwave chamber where the frying oil is heated, and then the heated frying oil is configured to flow back into the frying oil chamber,
   wherein the flow direction of the frying oil in the frying oil chamber is the same as a flow direction of the product that is transported by the means to transport the product,
   wherein the processing apparatus comprises a filter in the tube of the microwave chamber, and
   wherein the pump is controlled by a control system based on energy provided by the at least one solid-state radio frequency source.

2. Processing apparatus according to claim 1, wherein the microwave chamber is at least transparent for microwaves.

3. Processing apparatus according to claim 1, wherein the at least one solid-state radio frequency source is provided in an array of n columns and m rows, wherein n is an integer >1 and m is an integer ≥1.

4. Processing apparatus according to claim 1, wherein the at least one solid-state radio frequency source is a plurality of solid-state radio frequency sources that are provided equidistantly around a circumference of the microwave chamber.

5. Processing apparatus according to claim 1, wherein the pump transports the frying oil past the at least one solid-state radio frequency source.

6. Processing apparatus according to claim 1, wherein the control system is configured to control the at least one solid-state radio frequency source.

7. Processing apparatus according to claim 6, wherein the processing apparatus comprises a sensor that is configured to measure at least one property of the frying oil, wherein a signal of the sensor is utilized by the control system.

8. Processing apparatus according to claim 1, wherein one or more sensors are provided which measure radiation reflected from the frying oil.

9. Processing apparatus according to claim 8, wherein a signal of the one or more sensors is utilized to control the at least one solid-state radio frequency source and/or the pump which transports the frying oil past the at least one solid-state radio frequency source for heating the frying oil.

10. Processing apparatus according to claim 1, wherein the product is submerged in the frying oil inside the tube.

11. Processing apparatus according to claim 10, wherein the at least one solid-state radio frequency source is a plurality of solid-state radio frequency sources, wherein the tube is located within a housing, the housing comprises a plurality of openings defined around its circumference, each of the plurality of openings lead to a chamber in which one of the plurality of solid-state radio frequency sources is located, and the processing apparatus comprises a waveguide covering each of the plurality of openings and configured to direct radiation from the one solid-state radio frequency source located in the corresponding chamber to the tube.

12. Processing apparatus according to claim 11, wherein the housing is made of steel and the tube inside of the housing is made of a plastic and/or quartz material.

13. Processing apparatus according to claim 12, wherein the plurality of solid-state radio frequency sources are spaced about 72 degrees apart or about 90 degrees apart.

14. Processing apparatus according to claim 13, comprising a valve to adjust a flow of the frying oil out of the frying oil chamber towards the microwave chamber.

15. Processing apparatus according to claim 14, wherein the tube has an inner diameter between 0.15 m and 0.5 m and/or an inner area of 0.017 $m_2$-0.2 $m^2$.

16. Processing apparatus according to claim 14, wherein the tube has a round-shaped cross section and the tube is contained in a housing having a round-shaped cross section.

17. Processing apparatus according to claim 14, wherein the tube has a round-shaped cross section and the tube is contained in a housing having a square-shaped cross section.

* * * * *